United States Patent [19]

Takizawa et al.

[11] Patent Number: 5,121,444
[45] Date of Patent: Jun. 9, 1992

[54] PATTERN RECOGNITION APPARATUS

[75] Inventors: Yoshinori Takizawa, Tokyo; Naoko Yoshida, Kanagawa, both of Japan

[73] Assignee: Eastman Kodak Company, Rochester, N.Y.

[21] Appl. No.: 534,068

[22] Filed: Jun. 6, 1990

[30] Foreign Application Priority Data

Feb. 15, 1990 [JP] Japan ................................. 2-35246

[51] Int. Cl.⁵ ............................................ G06K 9/68
[52] U.S. Cl. ........................................ 382/30; 382/33; 382/34
[58] Field of Search .............................. 382/30, 34, 33

[56] References Cited

U.S. PATENT DOCUMENTS

| | | | |
|---|---|---|---|
| 3,601,802 | 8/1971 | Nakagome | 382/34 |
| 4,205,302 | 5/1980 | Godo | 382/34 |
| 4,498,189 | 2/1985 | Mori | 382/30 |
| 4,543,532 | 9/1985 | Kasser | 329/110 |
| 4,783,829 | 11/1988 | Miyakawa et al. | 382/30 |
| 4,905,162 | 2/1990 | Hartzband et al. | 382/30 |
| 4,949,396 | 8/1990 | Chung | 455/216 |

OTHER PUBLICATIONS

"Considerations in the Design of Character Pattern Recognition Devices" by E. C. Greanias and Y. M. Hill, Part 4, vol. 5, p. 119 of 1957 Ire National Convention Record.

Primary Examiner—Leo H. Boudreau
Assistant Examiner—David Fox
Attorney, Agent, or Firm—Raymond L. Owens

[57] ABSTRACT

A pattern recognition apparatus is disclosed that is capable of high-speed, automatic recognition of input image patterns with a high degree of accuracy and which also has a broad range of operational tolerance to shifts in the position of input image patterns. The pixel data of an input image are compared by separate circuits with pixel data of reference image patterns. Other circuits use these comparisons to select that one of the reference patterns to which the input image corresponds.

2 Claims, 4 Drawing Sheets

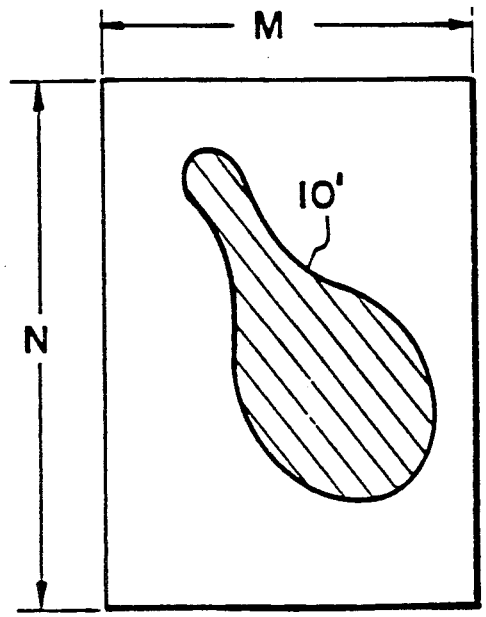
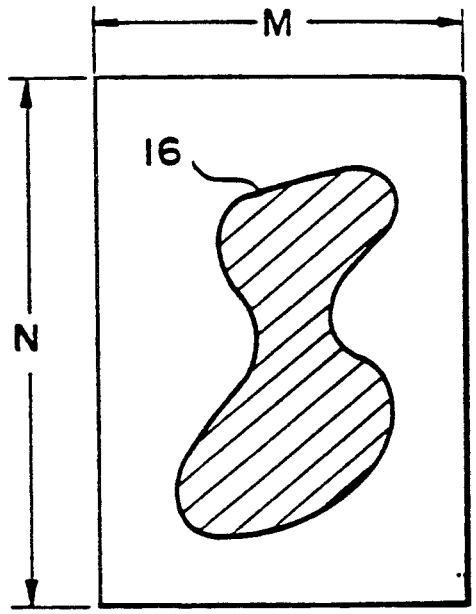
FIG. 4A    FIG. 4B
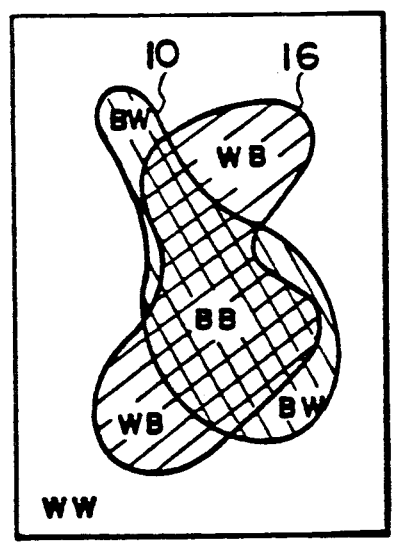
FIG. 5

PATTERN RECOGNITION APPARATUS

BACKGROUND OF THE INVENTION

1. Field of the Invention

The present invention relates to a pattern recognition apparatus based on the pattern matching method in which an input image is compared with a multiplicity of predetermined reference patterns.

2. Description of the Prior Art

In pattern recognition, an image read by an image reading apparatus is processed to determine the position, attitude, shape and other such geometric features in the image. Pattern recognition capability is becoming an essential part of the visual systems of intelligent robots able to autonomously adapt and change their behavior to match their surroundings. Pattern recognition has become a subject of central importance in the areas of robotics and computer vision.

Pattern matching is a fundamental technique in the practical implementation of pattern recognition systems. The method consists of comparing an input image pattern with a multiplicity of preset reference patterns and selecting the reference pattern which offers the closest match to the input image. This selection is based on certain evaluation parameters; correlation function and spatial distance are widely used for this.

If f is the input image vector, $g_i$ the ith vector of the reference pattern, * the vector inner product and $\| \ \|$ the vector of the distance in Euclidean space, the correlation function can be defined as $$(f^*g_i)/(\|f\| \cdot \|g_i\|). \tag{1}$$

From this, taking $f_j$ as the vector f element gives $$\|f\| = (\Sigma f_j^2)^{0.5} \tag{2}$$

In the pattern recognition operation this correlation function is calculated with respect to each of the reference patterns, and the reference pattern producing the maximum value is adopted as the recognition outcome.

Spatial distance is defined by $$\|f - g_i\| \tag{3}$$

In this case, too, this space function is calculated with respect to each of the reference patterns and the reference pattern producing the minimum value is adopted as the recognition outcome.

Although correlation and spatial distance can thus be used for the pattern recognition, one problem is that the comparative closeness of the evaluation parameter values and the reference pattern values means that the maximum and minimum values have to be calculated with a high degree of precision and recognition errors can readily occur. Another problem is the large number of quantities which have to be measured using equations (1) to (3) makes it hard to implement the method in hardware.

Pattern matching methods using other evaluation parameters have been proposed, including the one described in "Considerations in the design of character pattern recognition devices" E. C. Greanias & Y. M. Hill, part 4, vol. 5, p. 119 of 1957 IRE National Convention Record. In this method the evaluation parameter (EP) is defined as EP = (area of input image)/average unmatched area of input image and reference pattern) (4)

The denominator in equation (4) is obtained by dividing the total area of the unmatched portions of the input image pattern and the reference pattern by two. Thus, when the input image pattern and reference pattern are very similar, the denominator of equation (4) becomes substantially 0, giving the equation a very large value. Compared to methods using equations (1) or (3), this makes it easier to select the reference pattern and facilitates the recognition operation.

However, there are a number of problems with the pattern recognition method based on equation (4). For example, even when there is a substantial match between an input image pattern and a reference pattern, any positional shift of one pattern relative to the other that leads to an increase in the unmatched area increases the denominator of the equation (4). On the other hand, as the value of the equation (4) numerator is the area of the input image pattern/reference pattern, input image patterns which are either very large or very small give rise to a large variance in the equation (4) values. Another problem is that the decrease in the equation (4) value which accompanies the decrease in the area of the input image pattern produces a convergence of reference pattern values and a reduction in the recognition rate.

When equation (4) is applied to alphanumeric character recognition, the present inventor found that a slight positional shift or deviation of no more than several pixels between an input character pattern and a reference character pattern was enough to produce a major degradation in the recognition rate, making it impractical to use this equation (4) as a basis for the operation of a pattern recognition apparatus.

SUMMARY OF THE INVENTION

In view of the problems with conventional systems described above, the object of the present invention is to provide a pattern recognition apparatus capable of high-speed, automatic recognition of input image patterns with a high degree accuracy and which also has a broad range of operational tolerance to shifts in the position of input image patterns.

To attain the above object, the pattern recognition apparatus according to the present invention comprises a pattern recognition apparatus in which the recognition process is based on a comparison of an input image with the pixel data of predetermined reference patterns. The apparatus comprises storage means for storing reference pixel data which constitutes particular reference patterns; decision means corresponding to reference patterns for determining the matches between multiple pixel data comprising the input image pattern and its corresponding reference pattern pixel data stored in the storage means; first counting means corresponding to a particular reference pattern for counting the number of matched pixels as determined by its corresponding decision means; second counting means corresponding to a particular reference pattern for counting the number of unmatched pixels as determined by its corresponding means; calculation means corresponding to a particular reference pattern for calculating the ratio of the number of pixels counted by its corresponding first counting means to the number of pixels counted by its corresponding second counting means; and specification means responsive to the ratios calculated by the calculation means to select a particular one of the multiple reference patterns to which the input image pattern corresponds.

The present invention further comprises contour processing means which suspends counting by the first and second counting means when it is determined that reference pixel data to be processed by the decision means is data which is within a prescribed range along the contour of the reference pattern.

Thus, with the pattern recognition apparatus of this invention, matched and non-matched pixels of the input image and a reference pattern are determined and counted by the first and second counting means and the ratio of matched pixels to unmatched pixels is calculated. If Na is the number of matched pixels and Nd the number of unmatched pixels, the operation to obtain this ratio would be Na/Nd. When there is a substantial match between the input image pattern and a reference pattern, the denominator will converge to 0 while the numerator will converge to the prescribed number of pixels used to form the preset reference pattern.

Consequently when there is a substantial match between the input image and the reference pattern the said ratio will promptly converge to infinity, enabling the reference pattern which is the closest match to the input image to be specified with ease and precision by the specification means and the pattern recognition to proceed accordingly.

Using a contour processing means to stop the pixel counting operations when the reference pixel data to be processed is found to be within a prescribed region along the contour of the reference pattern ensures that even if a positional deviation should occur between the input image and the reference pattern, such a deviation in the contour region of the reference pattern will not affect the pixel ratio, thereby preventing the inclusion of calculation errors accompanying such a deviation.

Further features of the invention, its nature and various advantages will be more apparent from the accompanying drawings and the following detailed description of the invention.

BRIEF DESCRIPTION OF THE DRAWINGS

FIG. 4 (A) and 4 (B) are explanatory drawings of an input image pattern and a reference pattern, with respect to the same embodiment;

FIG. 5 is an explanatory drawing showing the input image superimposed on the reference pattern;

DETAILED DESCRIPTION OF THE INVENTION

Figure 1:
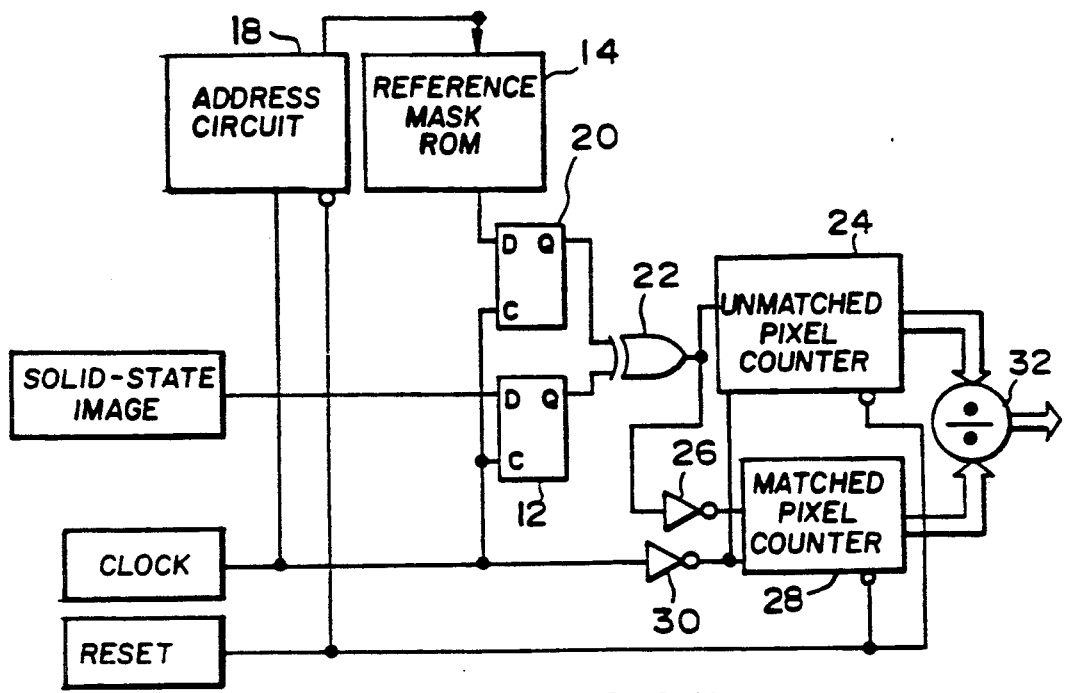
FIG. 1 is a circuit diagram of a pattern matching circuit according to a first embodiment of the present invention.

FIG. 1 shows the circuit arrangement of a pattern matching circuit 10 according to a first embodiment of the present invention. With reference to the drawing, a video camera equipped with a solid-state imager such as a CCD element, for example, is used to acquire an image, which is input to the pattern matching circuit as M×N pixel information, as shown in FIG. 4 (A). This pixel information is binarized to a light or dark shade density. In the example of FIG. 4 (A), image information corresponding to an input image pattern 10' is binarized to a dark value (logical level 0) and the surrounding background to a light value (logical level 1). This image information is then input to the D terminal of an input image D-type flip-flop 12.

The pattern matching circuit is provided with a reference mask ROM 14 in which is stored beforehand the reference pixel data used to form the multiple reference patterns. For example, M×N pixel information of a reference pattern 16 is stored in the reference mask ROM 14. Image information corresponding to the reference pattern 16 is also binarized to a dark value (logical level 0) and the surrounding background to a light value (logical level 1). In accordance with an address signal sent by an address circuit 18, reference pixel data is read out from the reference mask ROM 14 and input to the D terminal of a reference pattern D-type flip-flop 20.

A clock signal and a reset signal are input to the address circuit 18 which controls the read-out of data from the reference mask ROM 14. These are arranged so that following the reset by the reset signal, addresses are sequentially incremented by the clock signals.

Figure 2:
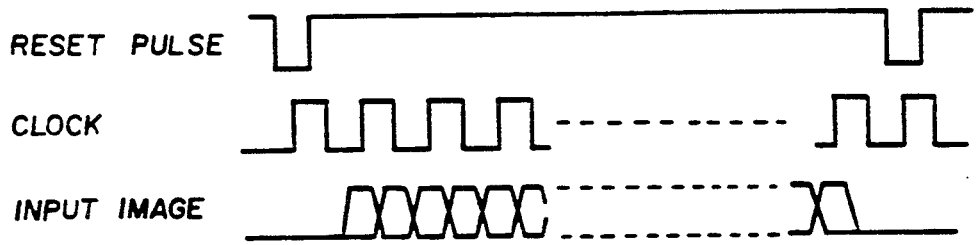
FIG. 2 is a timing chart of the circuit operations in the first embodiment.

FIG. 2 is the timing chart of the reset signal pulses, clock signals and input image information, showing that the input image pixel information is input after the address circuit 18 is reset by the reset signal.

The input image pixel information and the reference pattern pixel information are latched in the respective flip-flops 12 and 20 and synchronized by a clock signal input via clock terminals C, and then output to an Exclusive OR gate 22 which constitutes a decision means for deciding whether the two sets of pixel information are matched or unmatched. The output side of the Exclusive OR gate 22 goes to logical level 0 when each of the two inputs have the same logical value, and to logical level 1 when the inputs have different logical values. Thus, the output of the Exclusive OR gate 22 will only assume a logical 1 state when the pixel information from the input image flip-flop 12 and the pixel information from the reference flip-flop 20 do not match.

The output of the Exclusive OR gate 22 goes to an unmatched pixel counter 24 and, via an inverter 26, to a matched pixel counter 28, where matched and unmatched pixels are counted. When the inputs to the unmatched pixel counter 24 and matched pixel counter 28 are at logical 1, the counting is synchronized by the clock pulses, for which purpose a clock signal and reset signal are input, the reset signal via inverting input connection 30. This ensures that the output of the Exclusive OR gate 22 is reliably counted.

Figure 3:
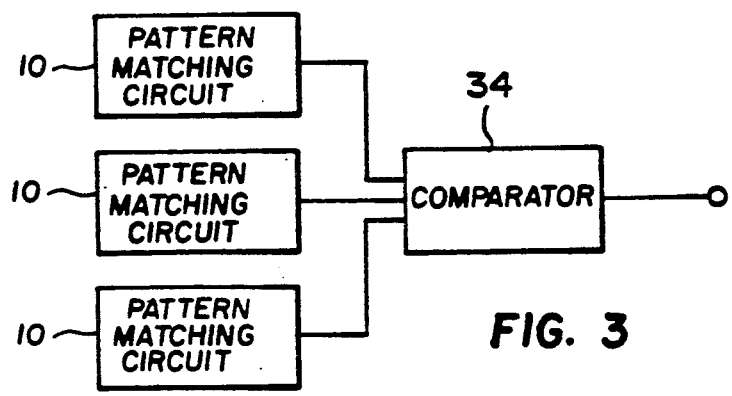
FIG. 3 is a schematic drawing showing the configuration of the same embodiment.

The outputs of the counters 24 and 28 are input to a divider 32 which calculates the ratio between the matched and unmatched pixel counts of the counters 24 and 28. One such pattern matching circuit 10 is provided for each reference pattern (FIG. 3) and the outputs of these circuits are compared by a comparator 34 to extract the largest value and specify the corresponding reference pattern as the one which most closely matches the input image. The processing of the input images thereby proceeds on a real-time basis for high-speed pattern recognition.

Thus, the Exclusive OR gate 22 determines whether input image pixel data and reference pixel data are matched or unmatched, and matched and unmatched pixels are counted by the counters 24 and 28. Details of this process will now be explained with reference to FIG. 5.

FIG. 5 shows the input image of FIG. 4 (A) superimposed on the reference pattern of FIG. 4 (B). The input image pattern 10' and reference pattern 16 are divided into the following four regions based on where they match or do not match.

WW: Regions where both input image pattern and reference pattern are light (logical level 1)
BB: Regions where both input image pattern and reference pattern are dark (logical level 0)
WB: Regions where the input image pattern is light (logical level 1) and the reference pattern is dark (logical level 0)
BW: Regions where the input image pattern is dark (logical level 0) and the reference pattern is light (logical level 1)

Regarding these four regions, the count by the unmatched pixel counter 24 corresponds to the pixel count of the WB and BW regions where there is a difference between the input image and the reference pattern, and the count by the matched pixel counter 28 shows the number of pixels in the BB and WW regions where the input image and reference pattern match. As such, the output from the divider 32 which divides the input from the matched pixel counter 28 by the input from the unmatched pixel counter 24 is $$(BB+WW)/(WB+BW) \quad (5)$$

Hence, as the input image and reference pattern becomes closer the numerator $BB+WW$ converges to $N \times M$ and the denominator $WB+BW$ to 0 (zero). This means that although with the convergence of the input image and the reference pattern the denominator may become 0, as the convergence of the numerator remains constant regardless of the area of the input image, convergence to infinity is far superior compared to systems based on the conventional equation (4).

In this embodiment, therefore, as there is a rapid convergence to infinity when the input image and reference pattern are substantially matched regardless of the area of the input image, it is possible to specify with good accuracy the reference pattern which most closely matches the input image.

Moreover, the superior convergence to infinity of the pattern recognition apparatus according to this embodiment makes it possible to use threshold processing instead of extraction of the maximum value. In such an arrangement, with reference to FIG. 3, the reference pattern that is the closest match can be specified by inputting a prescribed, sufficiently-high threshold value to the comparator 34 so that only pattern matching circuit outputs which exceed the threshold value are compared.

Figure 6:
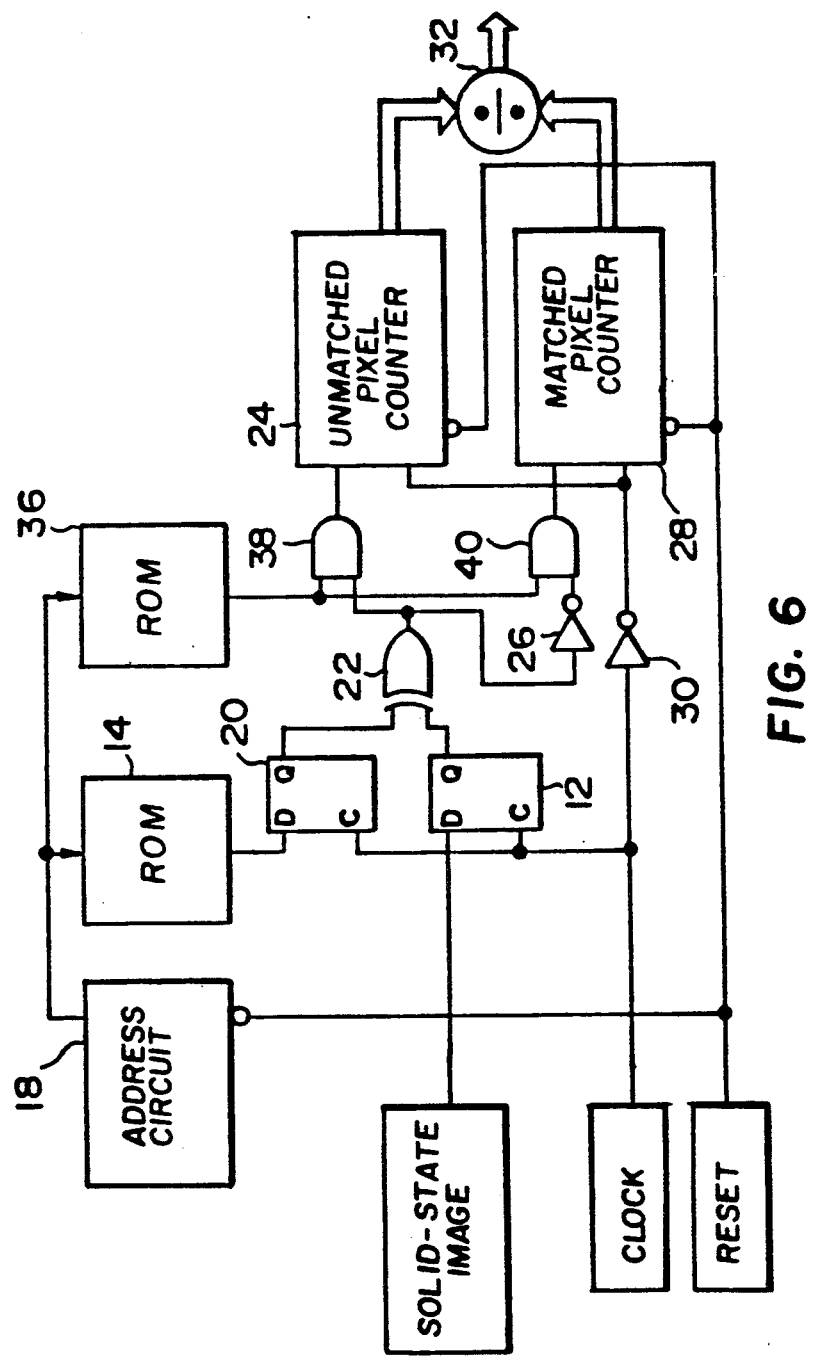
FIG. 6 is a circuit diagram of a pattern matching circuit according to a second embodiment of the present invention.
Figure 7:
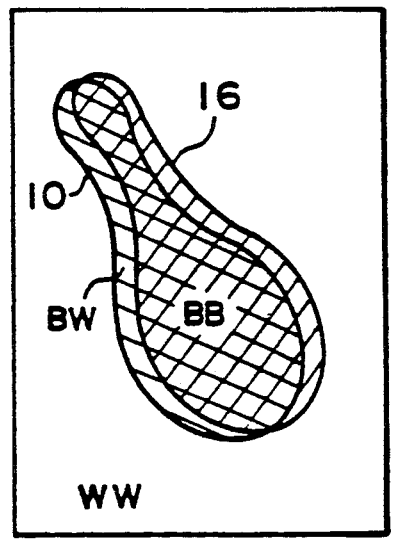
FIG. 7 is an explanatory drawing illustrating a positional discrepancy between an input image and a reference pattern in this embodiment.

FIG. 6 shows a pattern matching circuit according to a second embodiment of the pattern recognition apparatus of this invention. While the principal elements are the same as those of the first embodiment, this arrangement is further provided with contour processing means which enables pattern recognition to be carried out with good accuracy even when there is a relative positional shift between a matched input image pattern and reference pattern (FIG. 7). In this embodiment the contour processing means is formed by an insensible region ROM 36 and a pair of AND gates 38 and 40.

Figure 8:
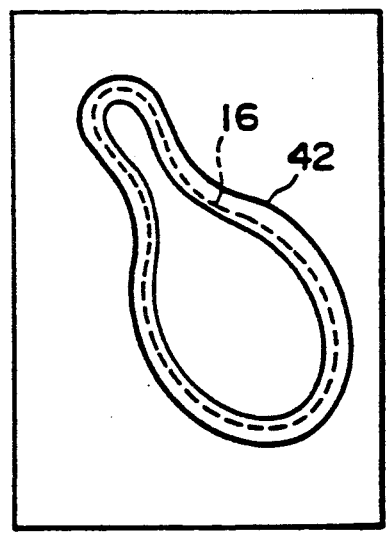
FIG. 8 is an explanatory drawing showing the insensible region provided around the periphery of the reference pattern in accordance with the embodiment.

Stored in the insensible region ROM 36 is a prescribed range for pixel data along the contour of the reference pattern 16. In the case of FIG. 8, for example, the insensible region ROM 36 contains pixel data relating to a region 42, indicated by the broken line, which is one pixel in extent around the contour of the reference pattern 16. The pixel data of this range is stored in the insensible region ROM 36 as logical 0 level data, and is read out from the insensible region ROM 36 under the control of an address signal issued by the address circuit 18.

The circuit is arranged so that data thus read out from the insensible region ROM 36 is input to one of the input terminals of the AND gates 38 and 40 and the output of the Exclusive OR gate 22 is input to the other input terminals.

$M \times N$ input image pixel information and reference pixel data stored in the reference mask ROM 14 are compared by the Exclusive OR gate 22 and matched and unmatched pixels are counted by the counters 28 and 24. When an address specified by the address circuit 18 corresponds to a location in the region 42 along the contour of the reference pattern 16, in addition to the output of pixel data stored at the corresponding address in the reference mask ROM 14, the corresponding logical level 0 pixel data stored in the insensible region ROM 36 is also output. At this point, gates 38 and 40 are both disabled, regardless of the states of input and reference pixel data, as long as pixel data of the insensible region 42 is being addressed in ROM 36. So the Exclusive OR gate 22 compares the input pixel data with the pixel data from the reference mask ROM 14 and outputs a logical 0 when the states of the two sets of pixel information are the same. As the AND gate 38 thus receives a logical 0 input from the insensible region ROM 36 and a logical 0 input from the Exclusive OR gate 22, the AND gate 38 outputs a logical 0 and counting of unmatched pixels by the unmatched pixel counter 24 stops. On the other hand, as the AND gate 40 receives an input from the Exclusive OR gate 22 inverted to logical 1 and the logical 0 input from the insensible region ROM 36, the AND gate 40 also outputs a logical 0, stopping the counting of matched pixels by the matched pixel counter 28. This means that when the reference pixel data concerned is within the region 42 along the contour of the reference pattern 16, the operation to determine matching/non-matching between the input image pattern 10' and the reference pattern 16 is stopped, which prevents the calculation of the ratio by the divider 32 being affected by any positional deviation which may occur between the patterns within the region 42.

The region therefore functions as an insensible region which does not have a bearing on the counts, so even when there is such a shift or deviation in the position of the input image pattern and reference pattern in this region 42, unmatched pixels within the BW and WB regions are not counted. As a result, the denominator of equation (5) remains near zero and a very large value can be maintained for the equation.

Establishing this insensible region along the contour of the reference pattern in which determination of matching/non-matching relative to the input image pattern does not take place ensures that a high level of pattern matching can be maintained even when positional deviation takes place between the input image and reference patterns.

Although the invention has been described with reference to pattern recognition, it is to be understood that it is not limited to this but may also be applied to the recognition of alphanumeric characters and the like.

The pattern recognition apparatus according to the present invention is therefore capable of high-speed, automatic recognition of input image patterns with a high degree of accuracy and a broad range of operational tolerance to positional shifts by the input image patterns.

The invention has been described in detail with particular reference to certain preferred embodiments thereof, but it will be understood that variations and modifications can be effected within the spirit and scope of the invention.

What is claimed is:

1. A pattern recognition apparatus in which the recognition process is based on a comparison of an input image with the pixel data of predetermined reference patterns comprising:

storage means for storing reference pixel data which constitutes particular reference patterns;

decision means corresponding to reference patterns, respectively, for determining the matches between multiple pixel data comprising the input image pattern and its corresponding reference pattern pixel data stored in the storage means;

first counting means corresponding to a particular reference pattern for counting the number of matched pixels as determined by its corresponding decision means;

second counting means corresponding to a particular reference pattern for counting the number of unmatched pixels as determined by its corresponding decision means;

calculation means corresponding to a particular reference pattern for calculating the ratio of the number of pixels counted by its corresponding first counting means to the number of pixels counted by its corresponding second counting means; and specification means responsive to the ratios calculated by the calculation means to select a particular one of the multiple reference patterns to which the input image pattern corresponds.

2. A pattern recognition apparatus according to claim 1 further comprising contour processing means which suspends counting by the first and second counting means when it is determined that reference pixel data to be processed by the decision means is data which is within a prescribed range along the contour of the reference pattern.

* * * * *